United States Patent [19]

DiMatteo et al.

[11] 4,067,409

[45] Jan. 10, 1978

[54] WHEEL CHAIR ARRANGEMENT

[75] Inventors: Paul DiMatteo, Huntington; Henry V. Diaferia, Brentwood, both of N.Y.

[73] Assignee: Dynell Electronics Corporation, Melville, N.Y.

[21] Appl. No.: 689,535

[22] Filed: May 24, 1976

[51] Int. Cl.[2] .......................... A47C 3/00; B62D 11/04

[52] U.S. Cl. .............................. 180/6.5; 180/DIG. 3; 297/353; 297/417; 297/DIG. 4

[58] Field of Search .......................... 180/6.5, DIG. 3; 297/353, 417, DIG. 4; 5/81 R, 86

[56] References Cited

U.S. PATENT DOCUMENTS

| | | | |
|---|---|---|---|
| 2,869,614 | 1/1959 | Wamsley | 4/134 X |
| 3,261,031 | 7/1966 | Gates | 5/86 |
| 3,654,643 | 4/1972 | Clanan | 5/86 |
| 3,882,949 | 5/1975 | Anderson | 180/DIG. 3 |
| 3,907,051 | 9/1975 | Weant | 180/DIG. 3 |

*Primary Examiner*—Joseph F. Peters, Jr.
*Assistant Examiner*—John A. Pekar
*Attorney, Agent, or Firm*—Max Fogiel

[57] ABSTRACT

A wheel chair with a retractable back rest, and a seat which may be uncovered to expose an opening that enables a patient in the wheel chair to use a toilet while remaining seated in the wheel chair. By actuating a switching arrangement, the patient may raise or lower the back rest to enable the person to be transferred with ease to a bed. A motor operated device may be actuated by the switching arrangement for uncovering an opening in the seat of the wheel chair and the latter may be wheeled directly over a conventional toilet bowl by motors operated selectively through the switching arrangement actuatable by the patient.

15 Claims, 6 Drawing Figures

WHEEL CHAIR ARRANGEMENT

BACKGROUND OF THE INVENTION

In the use of wheel chairs by invalids or patients that may be severely handicapped, it is desirable for the patient to be able to retract the back rest, so as to enable the patient to be transferred with relative ease to the top of a bed, for example. Whereas wheel chairs in the prior art may have back rests which are removable, these are not easily removable by the patient, while remaining seated in the wheel chair. Furthermore, the constructions of removable back rests in the prior art are substantially complex and costly.

In the use of wheel chairs by patients who may be invalids or are post-operated persons, it is also desirable for the patient to be able to move the wheel chair directly over a conventional toilet, and to use the toilet while remaining seated in the wheel chair. Such an arrangement avoids the necessity of transferring the patient from the wheel chair for the purpose of seating that person on a conventional toilet, bed pan or other toilet accessory. In wheel chairs, heretofore, there is not to be found the feature of permitting the wheel chair to be rolled directly over a conventional toilet. This feature allows the patient to use the toilet in the conventional manner, and avoids the requirement of attendants having to carry the person out of the wheel chair for this purpose.

Accordingly, it is an object of the present invention to provide a wheel chair in which the patient seated in the wheel chair may, at will, retract or reapply the back rest.

Another object of the present invention is to provide a wheel chair having a seat arrangement in which an opening may be uncovered, at will, and the wheel chair may be moved directly over a conventional toilet.

A further object of the present invention is to provide a wheel chair of the foregoing character in which the wheel chair functions may all be carried out by the patient, without requiring aid from attendants.

A still further object of the present invention is to provide a wheel chair arrangement, as described, which may be fabricated and maintained in service economically.

SUMMARY OF THE INVENTION

The objects of the present invention are achieved by providing a wheel chair in which the back rest is comprised of a sheet or strip of fabric mounted on a roll. The fabric material is mounted on the roll while the latter is subjected to spring tension which tends to keep the fabric material taut for any position of the roll. The mounting roller is supported on bearings which may be raised or lowered by operation of a motor controlled through a switching arrangement actuated by the patient. The raising and lowering of the mounting roller causes unwinding and winding, respectively, of the fabric against the back of the patient. The rolling action of the roller together with the fabric avoids friction or rubbing effects against the back of the patient while the back rest is either retracted or reapplied.

The seat of the wheel chair, in accordance with the present invention, is comprised of a strip or sheet of stiffened fabric which has a fully closed portion and an adjacent portion with an opening corresponding in size substantially to the opening of a conventional toilet seat. The fabric material of the seat is wound on a roller subjected to spring tension for maintaining the seat area taut. By winding or unwinding the seat fabric on a companion roller, the seat of the wheel chair may be provided with either the fully closed portion of the fabric, or the adjacent portion with the opening therethrough.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
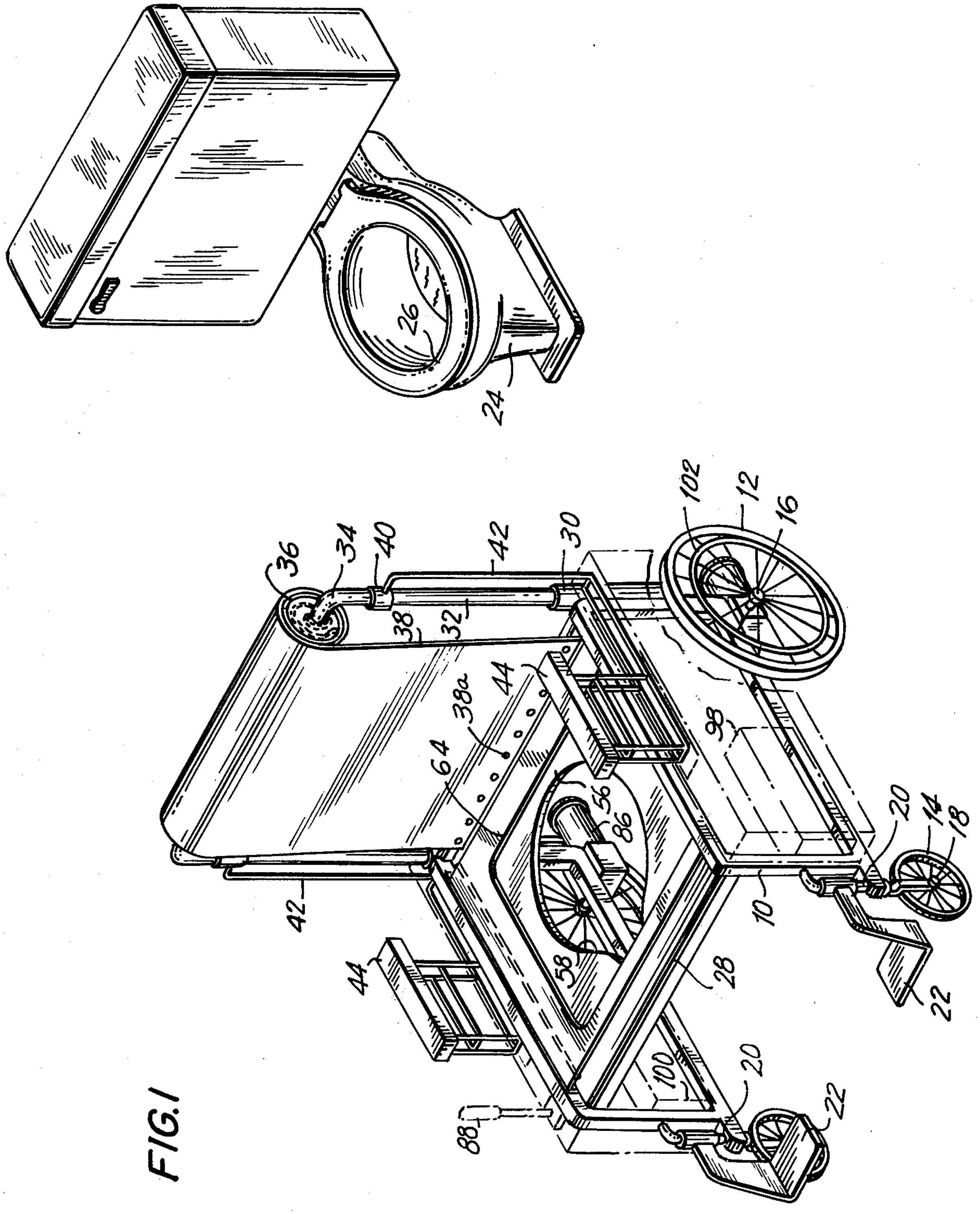
FIG. 1 is a perspective view and shows the construction of the wheel chair in accordance with the present invention.
Figure 2:
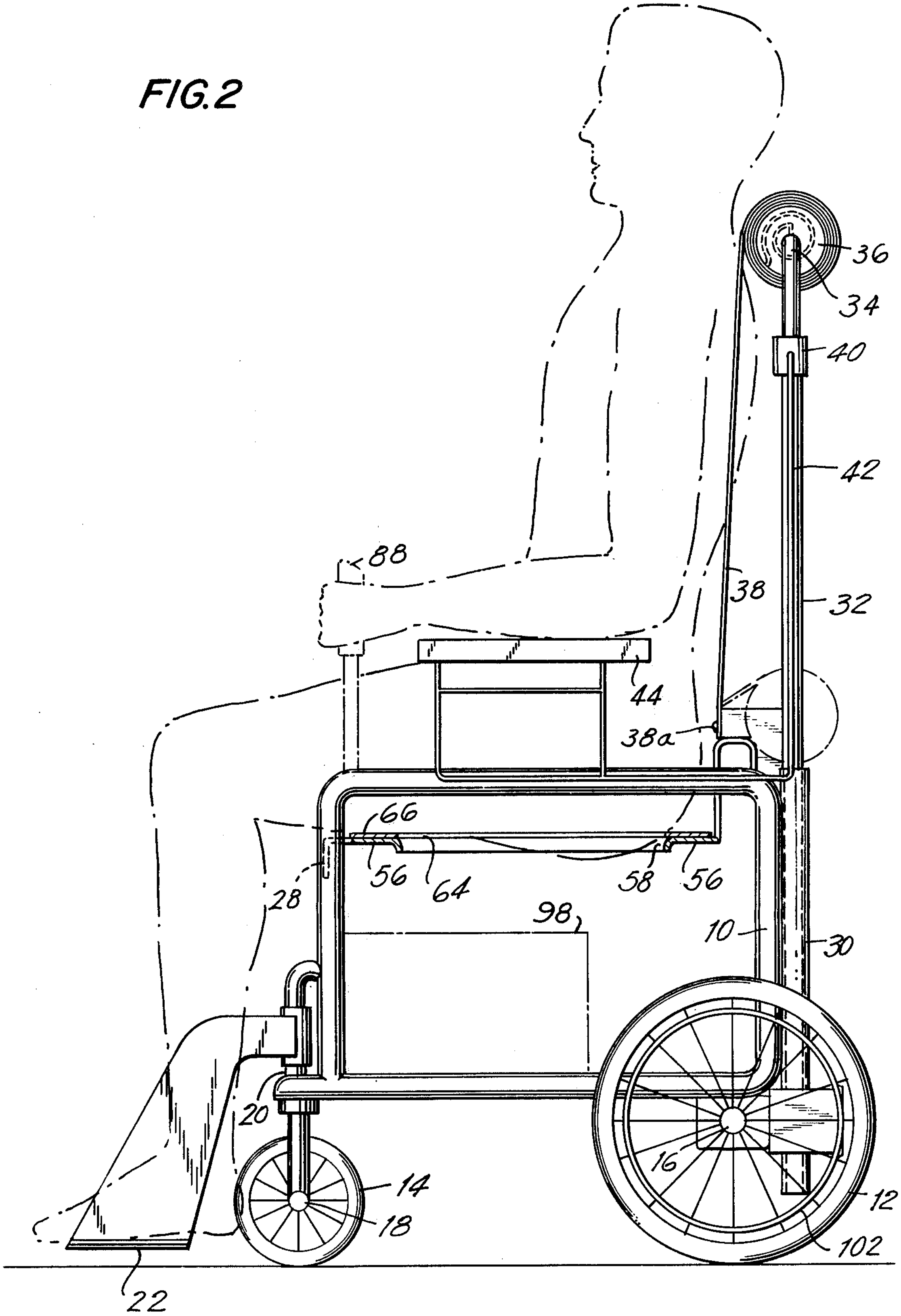
FIG. 2 is a side elevational view of the wheel chair in FIG. 1.

Referring to the drawings, the wheel chair in accordance with the present invention, has a base frame 10 mounted on rear wheels 12 and front wheels 14. The front wheels 14 are pivotable, whereas the rear wheels 12 are confined to rotate about the axle 16. Thus, the front wheels 14 are rotatable about their respective mounting axles 18, while being swivable about the supporting bearings 20 for purposes of turning the wheel chair either to the left or right of the patient.

Attached to the bearing mounting shafts 20, are foot rests 22 which are also swivable about the bearing shafts 20 so as to permit the foot rests 22 to be moved to the exterior sides of the wheel chair.

The base frame 10 of the wheel chair is constructed sufficiently wide so as to allow the wheel chair to be freely moved directly over a conventional toilet 24 which is provided with a conventional toilet seat 26. To allow the wheel chair to be moved over the toilet 24, in this manner, the space beneath the seat 28 of the wheel chair, is maintained free of structural parts. Accordingly, the axles 16 for mounting the wheels 12, are supported separately on their respective sides of the frame 10 of the wheel chair. The mounting shaft of the axles 10 do not extend through the width of the wheel chair from one side to the other.

Mounting to the rear of the frame 10 of the wheel chair, are tubular members 30 in which shaft members 32 are slidably held.

The slidable shaft members 32 have at their top ends, angular-shaped portions 34 which support a roller 36. Wound onto this roller 36, is a sheet or strip of fabric 38 fastened at one end 38*a* to the frame 10.

The roller 36 has an internally wound spring tending to rotate the roller 36 about the angled supporting shaft portion, in a direction which tends to maintain the strip 38 to be taut. For this purpose, a spring is provided within the roller and along the axis thereof, with one end of the spring fastened to the roller, for example, and the other end of the spring fastened to the supporting shaft portion 34. The arrangement for maintaining a winding roller under spring tension with an internally wound spring is already known in the art, and for this reason is not further described in detail.

The strip 38 serves as the back rest of the wheel chair, and it may be retracted by lowering the roller 36 as a result of sliding the shaft member 32 downward into the cylindrical or tubular members 30. As the roller 36 is moved downward while the shaft members 32 slide downward within the tubular members 30, the spring action within the roller 36 causes the strip 38 to be wound upon the roller, and to be maintained in taut condition during the downward passage of the roller. When the shaft members 32 have been fully slid within the tubular members 30 and the roller 36 has attained its lower-most position, the strip 38 is neatly wound onto the roller 36, and the back rest has been thus retracted.

To restore the back rest to the position shown in FIG. 1, for example, the roller 36 is then raised by withdrawing the shaft members 32 out of the tubular members 30 and sliding them upwards. During upward movement of the roller 36, in this procedure, the strip 38 is unwound from the roller while being maintained in taut condition.

When the roller 36 is in raised position, it serves as a direct support for the neck and/or head of the person seated in the wheel chair. For this purpose, the roller 36 may be raised or lowered to accommodate the specific height of the head or neck of the patient, and may be located so as to support any desired part thereof.

When the roller 36 is in raised position, the strip 38 conforms to the contour of the patient's back, and allows the patient to lean back comfortably. For this purpose, the strip 38 may be made of fabric material or other similar flexible type of material.

Attached to the upper portions of the slidable shaft members 32, are sleeves 40 supporting a linkage 42 connected directly to the arm rest 44. Thus, the arm rest 44 is linked directly to the sleeve 40, and when the latter is lowered with the lowering of the roller 36, the arm rest 44 is lowered correspondingly. Consequently, the arrangement is such that when the back rest is retracted, the arm rests 44 are lowered or retracted also. This feature allows a patient to be transferred to or from the wheel chair over the sides thereof. This feature is particularly advantageous when bringing the wheel chair along the side of a bed, for example, for purposes of transferring a patient between the wheel chair and the bed. With the wheel chair in accordance with the present invention, it is not necessary that the patient become seated into the wheel chair directly from the front side thereof. Accordingly, by retracting both the arm rests and the back rest simultaneously, all sides of the wheel chair are free, and the patient may be transferred to or from the wheel chair at any side or angle thereof. This arrangement is particularly advantageous when the patient carries out the transfer by himself, or without substantial aid from attendants, since the patient does not have to be substantially lifted in order to carry out the transfer. Thus, the height of the wheel chair may be made to correspond to the bed, and therefore the patient may simply slide between the bed and the wheel chair, while the latter is located with any one of the sides facing the bed.

Figure 5:
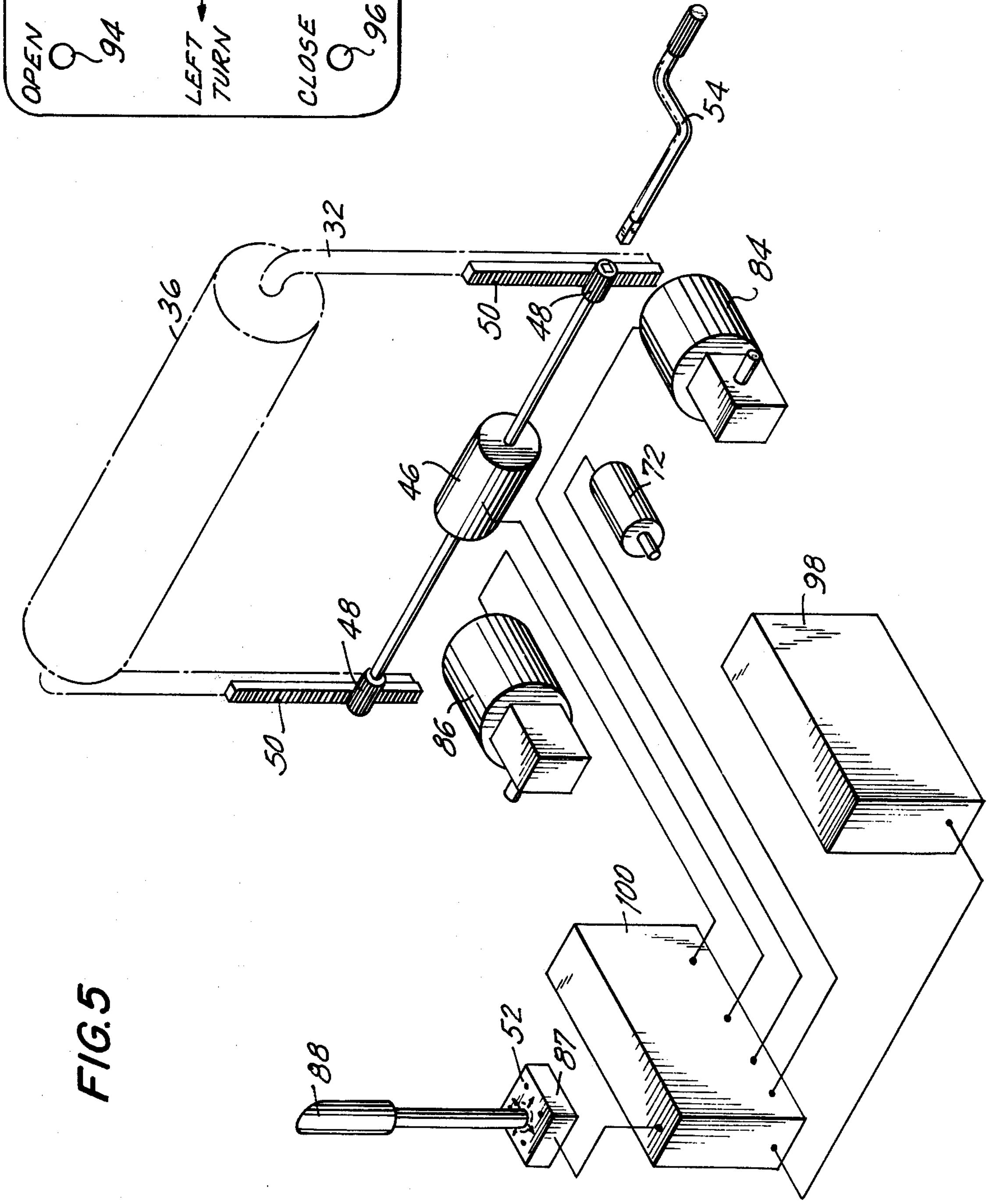
FIG. 5 is a schematic view and shows the electrically-operated elements and their interconnections in the wheel chair.

To raise and lower the sliding shaft members 32, there is provided a reversible motor 46 (FIG. 5) which drives pinions meshing with gear racks 50. By actuating the respective pushbutton on the control panel 52, for example, the patient may cause the motor 46 to be operated in the direction which will cause the roller 36 to move downward, for example. The motor 46 is provided with a limit switch which causes the motor to cease operation when the roller 36 has reached its lowermost position. The construction of such motors in combination with limit switches are already known in the art and for this reason are not described in further detail here. By operating the motor 46 in the reverse direction, the roller 36 may again be raised, and when it attains its upper-most position, the motor 46 is again stopped from operating by such limit switching means.

In the event of power failure or low battery voltage, it is possible to raise or lower the back rest by manual means through a hand crank 54 which may be inserted into one end of the pinion 48, for example.

Figure 3:
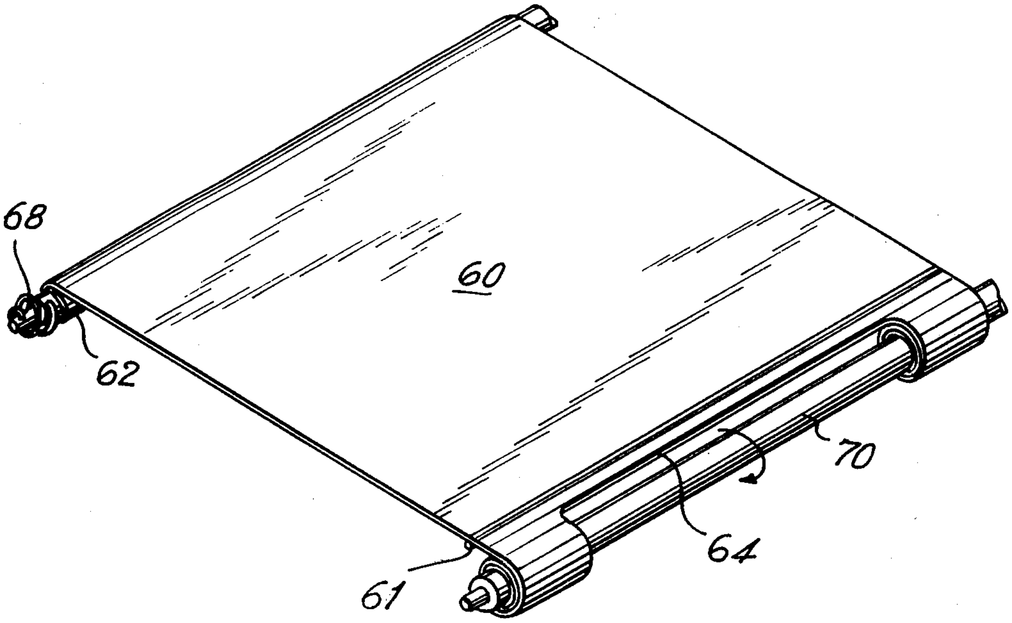
FIG. 3 is a perspective view and shows the construction of the selectable seat arrangement of the wheel chair.

The seat 28, of the wheel chair, in accordance with the present invention, has a fixed plate-shaped member 56 supported by the frame 10. This plate member 56 has an opening 58 therethrough, corresponding in size substantially to the opening of a toilet seat 26, for example. Mounted over the plate member 56, is the seating arrangement shown in FIGS. 3 and 4. In accordance with this arrangement, a strip of fabric material 60, for example, is wound onto a take-up roller 62. The strip 60 has a portion through which there is an opening 64 (FIG. 1), and an adjacent portion 66 (FIG. 4) which is completely closed and is free of any openings therethrough.

The roller 62 has an internally tensioned spring along the axis of the roller, for the purpose of urging the roller 62 in a direction so as to wind the strip 60 onto the roller. Thus, the spring construction within the roller 62 is similar to that described above in relation to the roller 36, and one end of a spring may be connected to the supporting shaft 68, whereas the other end of the spring may be connected to the roller 62. The spring is wound and tensioned so as to urge the roller 62 in the direction which will wind the strip 66 thereon. This action of the roller 62, also serves to maintain the strip 60 is taut condition.

The remaining portion of the strip 66 not wound onto the roller 62 is wound upon a drive roller 70.

Figure 4:
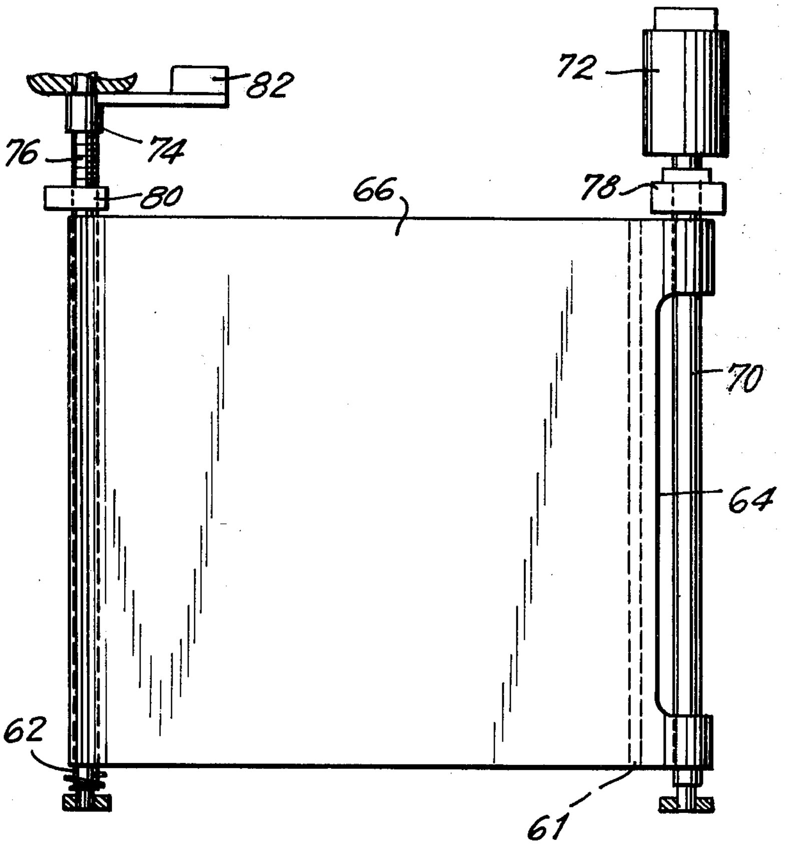
FIG. 4 is a plan view of the seat arrangement of FIG. 3.

In one operative position of the strip 66, the opening 64 is exposed and is located over the seat 28 of the wheel chair, as shown in FIG. 1. In this operative position, the solid portion 66 of the strip 60 is wound on the take-up roller 62. To cover the seat 28 with the solid portion 66, a motor 72 is operated. The latter drives the roller 70 in a direction which winds the strip 60 onto the roller 70, while the roller 62 is being unwound. As the motor 72 is operated, a nut 74 travels along the length of a threaded portion 76 of the roller 62. When the nut 74 has reached a limiting end of the threaded portion 76, as shown in FIG. 4. the motor 72 is stopped from rotating further. The motor 72 can be arranged in combination with a brake device within the motor for purposes of holding the shaft of the motor stationary against external torques, so that the spring-loaded action of the roller 62 cannot cause the roller 70 to rotate in the reverse direction once the motor has stopped. A ratchet mechanism can be used for this purpose in lieu of the brake device.

To return the opening 64 over the seat of the wheel chair, a coupling 78 is actuated to disengage the roller 70 from the motor 72. By freeing the roller 70, in this manner, the roller 62 is urged by its internal spring in the direction so as to wind the portion 66 onto its surface. With such winding action of the roller 62, the roller 70 becomes unwound, and the opening 64 is exposed over the seat of the wheel chair. In this position of the strip 60, the nut 74 is located at the opposite end, to that shown in FIG. 4, on the threaded portion 76. In this position of the nut 74, the latter is in contact with the bearing 80 for the roller 62, and prevents further rotation thereof. Thus, the nut 74 prevents further rotation of the roller 62 by being jammed against the bearing 80. At the other end of its travel along the threaded portion 76, the nut 74 may actuate a limit switch 82 for the purpose of disconnecting the motor 72 and stop operation thereof when the strip 60 is in the position shown in FIG. 4, so that the solid portion 66 is spread over the feet of the wheel chair. The limit switch 82 which may be actuated at the end of travel of the nut 74, and the electrical couplings 78 are known in the art, and are for this reason not further described in detail. The electrical coupling 78 is, for example, normally engaged so that the shaft of the motor 72 is mechanically coupled to the roller 70. By applying an electrical signal to the coupling 78, the latter becomes disengaged and releases the roller 70 from the shaft of the motor 72.

In raising and lowering the back rest of the wheel chair, it is also essential to note that it is not necessary to reverse the operation of the motor 46 for the purpose of lowering the backrest. The tension in the spring which urges the roller 36 to wind the strip 38 thereon, can be sufficient to force the sliding shaft members 32 in the downward direction. Thus, the winding action of the roller 36 tends to shorten the strip 38 along the back of the wheel chair, and this shortening effect results in a downward directed force along the axes of the sliding shaft members 32, which tends to move the roller 36 downward and thereby retract the back rest without the aid of operating the motor 46.

Figure 6:
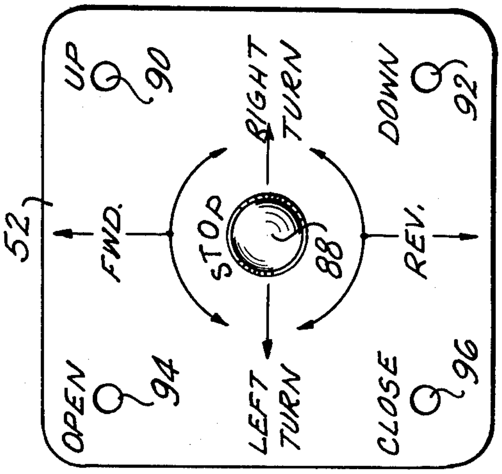
FIG. 6 is a plan view of the control panel of the switching arrangement actuated by the patient for operating selectively the electrical motors in the wheel chair.

For purposes of moving the wheel chair along the ground, there are provided motors 84 and 86 for driving the left and right rear wheels 12, respectively. These motors 84 and 85 (FIG. 5) may be operated selectively by means of a control lever 88 actuated by the person seated in the wheel chair, for example. To facilitate proper selection of the motors by that person, there is provided in accordance with the present invention, a control panel 52 (FIG. 6) which directs the person on how to actuate the lever to achieve the desired result. Thus, for purposes of turning the wheel chair left, the respective motor is operated by moving the control lever 88 in the direction shown on the control panel. The control lever may, accordingly, also be moved in directions for the purpose of reversing the motors and causing the wheel chair to move backwards, as desired. In forward position, both motors are operated and the wheel chair will move in a straight-line path. When the wheel chairs is to be stationary, the lever 88 is left in the position designated as stop on the control panel. Pushbuttons 90, 92 are also provided on the control panel 52 for the purpose of raising and lowering the back rest by operating the motor 46. Pushbuttons 94, 96 are provided for operating the motor 72 for the purpose of providing a fully closed seat or a seat with an opening therethrough.

Power for operating the motors on the wheel chair is provided by a rechargeable battery pack 98. The latter is connected to a control unit 100 which, in turn, applies power selectively to the motors, as directed by the control lever 88. The latter known in the art as a joy stick, is provided with switches in the associated switching unit 87, in the conventional manner, so that movement of the control lever 88 in a predetermined direction results in actuation of a respective switch which thereby energizes or connects a preselected motor for operation.

When choosing to operate the motor 46 in a manner whereby it is used only to drive the roller 36 in the upward direction, and not also in the downward direction, by relying on the spring loading action of roller 36 to move the latter downward as described above, the motor 46 is arranged similar to motor 72 which operates in conjunction with the coupling 78. Such a coupling may be made part of the motor 46 as conventionally known in the art.

In accordance with the present invention, it is not essential to operate the wheel chair through any of the motors. The wheel chair may be driven manually by means of rail-hand drives 102, and the back rest may be raised or lowered by means of the hand crank 54, as already described above. The hand crank 54 can then be used in conjunction with the drive roller 70, in a similar manner, to wind and unwind the strip 60 with respect to the roller 62.

The rolled strips 38 and 60 may be fabricated of cloth type of material or of synthetic materials. The rolled strip 60, furthermore, may be provided with stiffening elements 61 which reinforce the strip 60 against flexure in the transverse direction.

Without further analysis, the foregoing will so fully reveal the gist of the present invention that other can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the followings.

We claim:

1. A wheel chair arrangement comprising: a supporting frame; means on said frame for seating a person in the wheel chair; wheel means connected to said frame for moving said frame; a back rest carried by said frame; actuatable means linked to said back rest for retracting said back rest when actuated to a retracted position from a support position in which said back rest can support the back of a person seated in the wheel chair; means for reducing substantially the space occupied by said back rest while said back rest is retracted from said support position to said retracted position; and means for returning said back rest from a retracted position to said support position.

2. The wheel chair arrangement as defined in claim 1 including arm rest means connected to said back rest and movable with said back rest.

3. The wheel chair arrangement as defined in claim 1 wherein said back rest comprises roller means with a sheet strip of material wound thereon, a portion of said sheet strip extending along the area of the back rest and held by said frame for supporting the back of a person seated in said wheel chair.

4. The wheel chair arrangement as defined in claim 1 wherein said supporting frame has a predetermined width and height for wheeling said wheel chair directly over a toilet bowl.

5. The wheel chair arrangement as defined in claim 1 including a displaceable seat member on said seating means and having two adjacent portions, one portion having an opening therethrough, and the other portion being free of an opening.

6. The wheel chair arrangement as defined in claim 1 including motor means connected to said wheel means for moving said wheel chair by rotating said wheel means selectively; and means for operating said motor means for turning said wheel chair in desired directions.

7. The wheel chair arrangement as defined in claim 1 including means for storing the back rest substantially in the vicinity of said seating means when said back rest is retracted.

8. A wheel chair arrangement comprising: a supporting frame; means on said frame for seating a person in the wheel chair, wheel means connected to said frame for moving said frame; a back rest carried by said frame; actuatable means linked to said back rest for retracting said back rest when actuated to a retracted position from a support position in which said back rest can support the back of a person seated in the wheel chair; and means for returning said back rest from a retracted position to said support position; said back rest comprising roller means with a sheet strip of material wound thereon, a portion of said sheet extending along the area of the back rest and held by said frame for supporting the back of a person seated in said wheel chair, movable bearing means for supporting said roller means, said movable bearing means being connected to said retracting means, and means for rotating said roller means; said roller means being retracted and rotated for retracting said back rest.

9. The wheel chair arrangement as defined in claim 8 including means for fastening one end of said strip sheet material to said frame; and means for urging said roller means in a predetermined direction for retaining said strip sheet material in substantially taut condition along the area of the back rest when in said support position.

10. The wheel chair arrangement as defined in claim 9 including telescopic means supporting said movable bearing means carrying said roller means, said telescopic means being retracted for retracting said back rest.

11. The wheel chair arrangement as defined in claim 10, including motor means linked to said telescopic means for displacing said telescopic means.

12. A wheel chair arrangement comprising: a supporting frame; means on said frame for seating a person in the wheel chair; wheel means connected to said frame for moving said frame; a back rest carried by said frame; actuatable means linked to said back rest for retracting said back rest when actuated to a retracted position from a support position in which said back rest can support the back of a person seated in the wheel chair; and means for returning said back rest from a retracted position to said support position; a displaceable seat member on said seating means and having two adjacent portions, one portion having an opening therethrough, and the other portion being free of an opening; roller means for winding thereon said displaceable seat member, said displaceable seat member comprising sheet strip material.

13. The wheel chair arrangement as defined in claim 12 wherein said roller means comprises two rollers on opposite sides of said wheel chair, one roller being urged in a predetermined direction of rotation for winding said strip sheet material thereon to maintain said strip sheet material in taut condition over the seating area of said wheel chair.

14. The wheel chair arrangement as defined in claim 13 including motor means linked to said roller means for operating said roller means to displace said seat member.

15. A wheel chair arrangement comprising: a supporting frame; means on said frame for seating a person in the wheel chair; wheel means connected to said frame for moving said frame; a back rest carried by said frame; actuatable means linked to said back rest for retracting said back rest when actuated to a retracted position from a support position in which said back rest can support the back of a person seated in the wheel chair; and means for returning said back rest from a retracted position to said support position; arm rest means connected to said back rest and movable with said back rest; said back rest comprising first roller means with strip sheet material wound thereon; movable bearing means supporting said first roller means, one end of said strip sheet material being connected to said frame; means for urging said first roller means in a predetermined direction of rotation for maintaining taut said strip sheet of material when in said support position; telescopic means for carring said first roller means, said telescopic means being retracted for retracting said back rest; first motor means connected to said telescopic means for moving said first roller means between said support position and said retracted position, said frame having a predetermined width and height for wheeling said wheel chair directly over a toilet bowl; a displaceable seat member on said seating means and having two adjacent portions, one portion having an opening therethrough, and the other portion being free of openings; second roller means for winding thereon said displaceable seat member, said displaceable seat member comprising strip sheet material; said second roller means comprising two rollers on opposite sides of said wheel chair, one of said rollers being urged in a predetermined direction of rotation for maintaining taut said displaceable seat member over the seating area of said wheel chair; second motor means connected to said roller means for displacing said seat member; third motor means connected to said wheel means for moving said wheel chair by turning said wheel means; means for selectively actuating said third motor means for turning said wheel chair in predetermined directions; and means for actuating selectively said first and second motor means.

* * * * *